United States Patent [19]

Pacht

[11] Patent Number: 4,579,209

[45] Date of Patent: Apr. 1, 1986

[54] CLUTCH AND THROTTLE SYSTEM FOR REMOTE CONTROL OF ENGINE SPEED

[75] Inventor: Amos Pacht, Houston, Tex.

[73] Assignee: Butterworth Inc., Houston, Tex.

[21] Appl. No.: 605,058

[22] Filed: Apr. 30, 1984

[51] Int. Cl.[4] ............................................ B60K 41/02
[52] U.S. Cl. .............................. 192/0.084; 192/0.096
[58] Field of Search .............. 192/0.096, 0.084, 0.048, 192/103 R, 0.075, 0.076

[56] References Cited

U.S. PATENT DOCUMENTS

| | | | |
|---|---|---|---|
| 2,933,168 | 4/1960 | Leibing et al. | 192/0.084 |
| 3,207,277 | 9/1965 | Spence | 192/0.096 |
| 3,667,577 | 6/1972 | Weymann | 192/0.084 X |

*Primary Examiner*—George H. Krizmanich
*Attorney, Agent, or Firm*—Donald F. Wohlers

[57] ABSTRACT

A hybrid control system is employed utilizing both hydraulic and pneumatic principles to effectively control the engine speed from a remote location as well as controlling the clutch engagement between the engine and a typical load such as a high pressure pump. The hybrid control system utilizes a pneumatic actuator for disengagement of the normally engaged engine clutch mechanism and a hydraulic actuator for control of engine throttle setting. Each of these actuators is controlled through the use of several electrically actuated solenoid valves which are effective to selectively apply a source of air pressure either to the pneumatic clutch actuator for disengaging the clutch or applying air pressure to the top of a hydraulic fluid reservoir to operate a hydraulic actuator connected to the engine throttle mechanism. Increase or decrease in engine speed is accomplished respectively by either releasing the hydraulic pressure in the hydraulic actuator to atmosphere or pressurizing, from the air supply source, the hydraulic fluid in a hydraulic reservoir. Constant speed settings for the engine are obtained by the electrical control of a normally closed solenoid blocking valve means which is effective to isolate the hydraulic fluid transferred from the hydraulic reservoir to the hydraulic actuator from the pressurized hydraulic fluid reservoir. A safety interlock mechanism is also provided to assure decrease in engine RPM whenever the clutch is disengaged.

13 Claims, 1 Drawing Figure

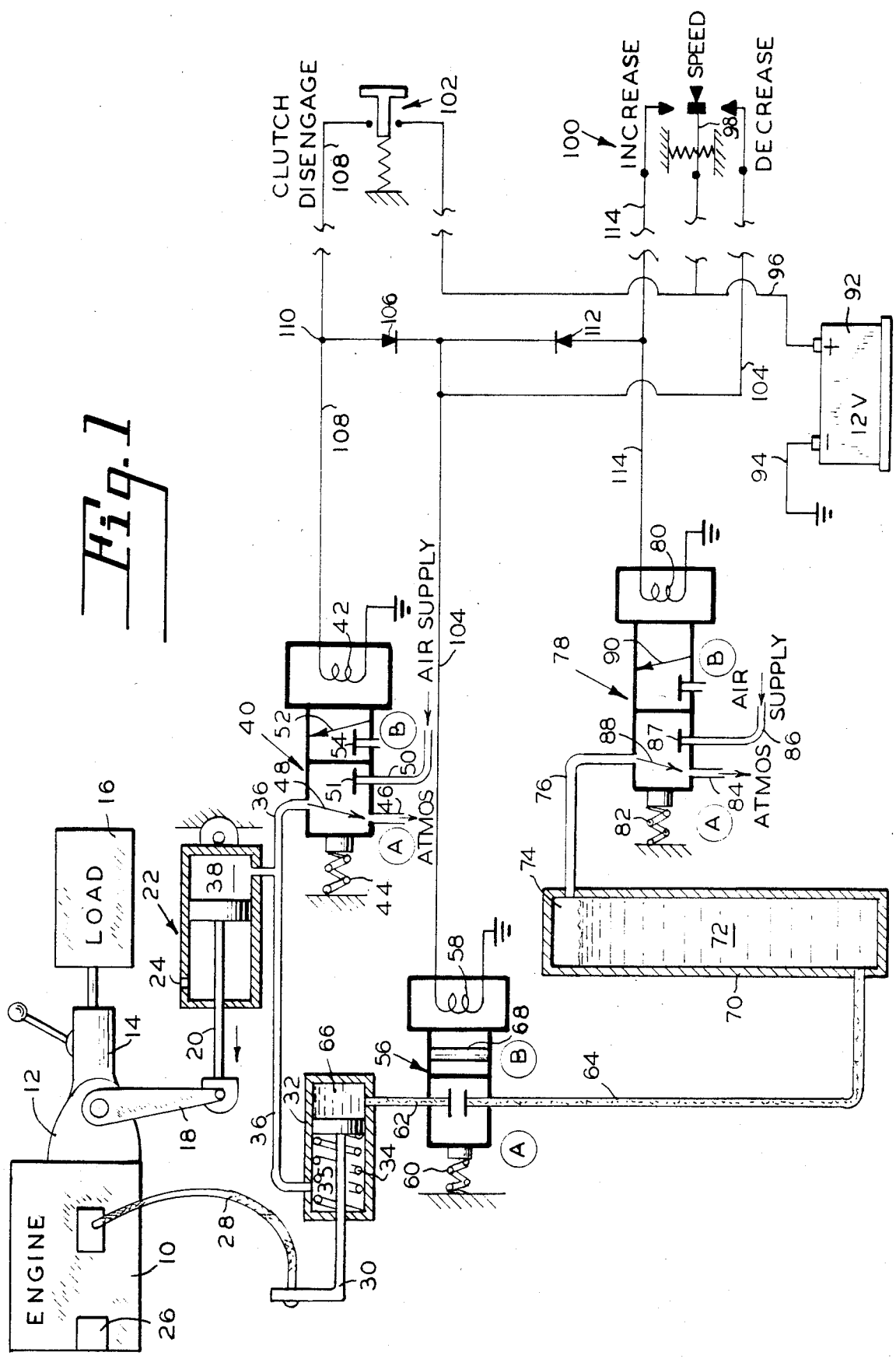

CLUTCH AND THROTTLE SYSTEM FOR REMOTE CONTROL OF ENGINE SPEED

BACKGROUND OF THE INVENTION

The field of the present invention relates to the control of engines in driving engagement with a load through a conventional clutch mechanism wherein the speed of the engine may also be varied. In particular, the field of the invention relates to a clutch and throttle control system of an engine driving a high pressure liquid pump wherein it is desired to operate the engine and vary the speed thereof from a distance physically removed from the engine and pump.

Such remote control systems have been constructed in the past using either all electric or all pneumatic controls for accomplishing the desired change in throttle setting or desired clutch disengagement from the load. However, in prior art pneumatic or electric systems of this type, certain disadvantages arise since in an all-pneumatic remote control system, large pressure drops will occur whenever the remote control station is at a great distance from the engine. Not only will large pressure drops occur due to the long pneumatic control lines, but additionally, as the distance increases from the control station to the engine to be controlled, greater and greater time lag will be introduced due to compensability and pressure drop factors in the pneumatic lines.

In an all-electric remote control system, while the disadvantage of pressure drop and time lag of a pneumatic system is avoided, undesirable high cost of electric throttle and clutch actuators and controls therefor is encountered, thereby making an all-electric remote control system undesirable from an economic standpoint.

SUMMARY OF THE INVENTION

The present invention represents an optimization of the best features of all electrical control systems without their undesirable high cost and the best features of pneumatic control systems without their undesirable pressure drops and time delays due to long length pneumatic lines. In accordance with the present invention, a hybrid control system is employed utilizing both hydraulic and pneumatic principles to effectively control the engine speed from a remote location as well as controlling the clutch engagement between the engine and a typical load such as a high pressure pump. The hybrid control system of the present invention utilizes a pneumatic actuator for disengagement of the normally engaged engine clutch mechanism and a hydraulic actuator for control of engine throttle setting. Each of these actuators is controlled through the use of several electrically actuated solenoid valves which are effective to selectively apply a source of air pressure either to the pneumatic clutch actuator for disengaging the clutch or applying air pressure to the top of a hydraulic fluid reservoir to operate a hydraulic actuator connected to the engine throttle mechanism. Increase or decrease in engine speed is accomplished respectively by either releasing the hydraulic pressure in the hydraulic actuator to atmosphere or pressurizing, from the air supply means, the hydraulic fluid in a hydraulic reservoir. Constant speed settings for the engine are obtained by the electrical control of a normally closed solenoid blocking valve means which is effective to isolate the hydraulic fluid transferred from the hydraulic reservoir to the hydraulic actuator from the pressurized hydraulic fluid reservoir.

Similar cost and operating disadvantages will be present in an all hydraulic remote control system or in electro-hydraulic systems as well.

The present hybrid electropneumatic control system includes safety interlock features to assure that whenever clutch disengagement is accomplished that there will be an immediate and quick corresponding reduction in the throttle setting of the engine to prevent overspeeding thereof upon removal of the load from the engine. This interlock, between the clutch and the throttle control circuits, is supplemented through the use of pressurized air from the pneumatic supply system to assist the hydraulic actuator in accomplishing fast speed reduction upon release of the hydraulic pressure within the actuator. Automatic speed reduction upon clutch disengagement is particularly desirable in remote control systems wherein the operator may be physically removed from the ordinary engine noise. In such cases, the operator is not necessarily aware through his own audible senses of the actual engine speed and thereby might inadvertently disengage the clutch at high engine RPM, thereby causing a dangerous overspeeding condition.

Accordingly, it is a principle object of the present invention to provide a highly reliable low cost remote control system for disengaging the clutch between an engine and a load and for adjusting the throttle speed setting of said engine.

A further object of the invention is to provide a remote control system employing both hydraulic and pneumatic principles to overcome the disadvantages of all-pneumatic, all-hydraulic or all-electric control systems.

Another object of the invention is to obtain the advantages of an all-hydraulic throttle control system without its cost disadvantages by utilizing pneumatic air supply means to provide the power to a small hydraulic portion of the system.

A still further object of the invention is to provide a novel hybrid engine control system having an interlock between the clutch disengagement mechanism and the throttle reduction mechanism to prevent overspeeding of the engine.

A still further object of the invention is to provide a control system which is simple in design, low in cost, quick in response, safe in operation, and rugged in construction.

These and other objects and advantages of the invention will become apparent and the invention will be fully understood from the following description and drawings in which:

FIG. 1 is a schematic diagram of the invention as it would be applied to control the clutch of an engine as well as the speed thereof.

DETAILED DESCRIPTION OF THE INVENTION

Referring to FIG. 1, an internal combustion engine 10 is connected through a clutch 12 and transmission 14 to a load 16. The load 16 typically may be a high pressure positive displacement water pump which may be used for water blasting cleaning operations. The clutch 12 includes a control lever 18 whose outboard end is pivotally connected to a piston rod 20 of a pneumatic clutch control actuator designated 22. It will be understood that the position of the clutch control level 18 and associated actuator 22 is in the engaged position of the clutch to which position the actuator will return due to the normal internal springs (not shown) holding the clutch in the engaged position.

The actuator 22 includes a vent aperture 24 and an internal pressure chamber designated 38. The engine 10 may include an air supply pump 26 which may readily be engine driven or may be obtained from a separate source of pressurized gas supply. The output of the air supply pump 26 will be understood to be readily connectable through appropriate conduits to the various components of the control circuits requiring air supply such as conduits 50 and 86. The engine 10 also includes a suitable throttle cable 28 attached thereto and (also attached) to an actuator piston rod 30 of a hydraulic throttle control actuator generally designated 32. The hydraulic actuator 32 includes an internal return spring 34 which normally biases the piston rod 30 in a direction to decrease the speed of the engine. The actuators 22 and 32 are interconnected by a conduit 36 which also communicates with a clutch control solenoid valve generally designated 40. It will be appreciated that the solenoid valve 40 is represented schematically and is shown in the normally "off" or unenergized condition of such solenoid valve. This is also the schematic drawing convention for the other solenoid valves 56 and 78 which will be described hereafter. It will be understood that in such normal unenergized state of each of the solenoid actuated valves that the relationship of the valve components will be as illustrated in position A of the valve, and that upon energization of each of the valves that they will assume the configuration as indicated in position B of the valve.

The clutch control solenoid valve 40 includes a winding 42 which, when energized, actuates the armature of the valve to transfer it to its B state, its A state being maintained by a armature bias return spring 44. In position A of valve 40, it will be understood that chamber 38 of actuator 22 is vented through the conduit 36, through the passageway designated by the flow path arrow 48 to an atmospheric venting port 46 as shown. In position A of solenoid valve 40, the air supply to conduit or port 50 is cut off and shown blocked schematically by the plate or stop symbol 51. When the solenoid valve 40 assumes its energized state, i.e. position B, the vent 46 to atmosphere will be blocked by stop plate 54 and the air supply through conduit 50 will traverse the valve through the communication flow path arrow 52 to place the air supply pressure in communication with conduit 36 to thereby pressurize the chamber 38 within the pneumatic actuator 22 to disengage the clutch, and at the same time assist the return sprinq 34 by pressurizing the chamber 35 thereabout.

The throttle control system includes a throttle hold solenoid valve 56 having a winding 58 and an armature return spring 60. As mentioned previously, solenoid valve 56 is shown in its normally "off" or unenergized state wherein the position A thereof is such to block hydraulic fluid flow from hydraulic line 62 into hydraulic line 64. Upon energization of solenoid valve 56, it will assume the flow path condition indicated by position B thereof to place hydraulic line 64 into fluid communication with hydraulic line 62 through the internal passageway within the valve designated 68. In this latter energized position of the valve 56, hydraulic fluid 72 contained in the reservoir 70 is free to flow through the conduit 64, 68, 62 into the hydraulic chamber 66 of the actuator 32 to increase the speed of the engine. Such increase in engine speed is accomplished by virtue of the simultaneous pressurization of the air chamber 74 in the upper portion of the reservoir 70.

The upper air chamber 74 communicates through a conduit 76 to a throttle control solenoid valve generally designated 78 and also shown in a schematic manner indicating its respective unenergized and energized positions A and B. The valve 78 will be seen to be identical with valve 40, both of which, for example, may be of the type manufactured by Humphrey, Model No. 125 El. In the same way, valve 56 may be the same type as valves 40 and 78, but connected for two-way operation rather than in a three-way mode.

The solenoid valve 78 includes a winding 80 and a return spring 82. In its unenergized state as shown at position A thereof, the conduit 76 communicates through the flow path arrow designated 88 to the vent to atmosphere port 84. The air supply through conduit 86 is effectively stopped by the cover plate 87. Upon energization of the winding 80, the valve internals assume the positions designated at B wherein the air supply conduit 86 communicates through a flow path arrow designated schematically at 90 to place conduit 76 and chamber 74 in direct communication with the air supply pressure of inline 86 thereby pressurizing the upper surface of the hydraulic fluid 72 within the reservoir 70.

A DC power source designated 92 is connected to ground via conductor 94. A conductor 96 attached to the power source 92 is connected to the center terminal 98 of a single pole double throw speed control switch designated 100. Conductor 96 also is connected to one terminal of a clutch disengage switch designated 102. The switch 102 includes an electrical lead 108 connected via terminal 110 to the winding 42 of the solenoid valve 40. Terminal 110 is electrically connected through blocking diode 106 to conductor 104 which connects with winding 58 of solenoid valve 56 and to the speed decrease terminal of the switch 100. Winding 80 of solenoid valve 78 is connected through conductor 114 to the speed increase terminal of the speed control switch 100.

In operation, when it is desired to increase the speed of the engine 10, the center terminal 98 of the speed control switch 100 is moved to an uppermost position thereby connecting conductor 96 to conductor 114 and energizing the solenoid valve 78. The electrical potential on conductor 114 at the same time is able to flow through the blocking diode 112 and energize conductor 104 and winding 58 of solenoid valve 56. Accordingly, when the speed control is in the increase position, air pressure will be supplied through conduit 86 via the arrow path 90 to pressurize the upper chamber 74 to expel hydraulic fluid upwardly through conduit 64, blocking valve 56, passageway 68 and into the chamber 66, to thereby move the hydraulic actuator rod in a direction to increase the speed of the engine. Once the desired increased speed of the engine is obtained, the operator merely has to return the center terminal of the speed control switch to its central and neutral position, whereupon valve 56 will return to its A position and lock the hydraulic fluid within chamber 66 to thereby hold the engine RPM setting at the desired RPM, and valve 78 will return to its A position (i.e. de-energized) and allow chamber 74 to depressurize to atmospheric.

Similarly, upon a desire to decrease the engine RPM, the center terminal 98 of the speed control switch is moved to the decrease position, thereby energizing conductor lead 104 but not conductor lead 114 since blocking diode 112 will prevent such energization. Accordingly, upon energizing of valve 56 by application current to winding 58, the hydraulic pressure within chamber 66 will be released through the internal passageway 68, conduit 64, into the reservoir 70. However, because the solenoid valve 78 did not also become energized, the air pressure within chamber 74 is free to vent through conduit 76, communication arrow flow passage 88 to the atmospheric vent 84 of position A of the valve 78.

In like fashion, when the operator desires to declutch or disengage the engine 10 from the load 16, he merely need push the switch 102 to its closed position. In this manner, energization of conductor 108 will be accomplished through conductor 96 and solenoid valve 40 will be transferred to its B state upon energization of the winding 42. This has the effect of immediately transferring the state of valve 40 to its B position to place the air supply conduit 50 in communication through the flow arrow 52 to place air pressure upon the chamber 38 of the pneumatic actuator 22, thus moving rod 20 to the left to thereby disengage the engine from the load. At the same time, the electrical energy available in conductor 108 is permitted to flow through diode 106 to energize winding 58 to thereby release the hydraulic pressure in chamber 66. Occurring simultaneously therewith is the application of air pressure through conduit 36 to the chamber surrounding return spring 34 to assure quick and rapid return of the throttle cable actuating rod 30 to a low speed idle condition of the engine. In this way, over-speeding of the engine is avoided automatically since any time the clutch is disengaged, the throttle is automatically reduced.

While a specific embodiment of the invention has been shown and described in detail to illustrate the application of the inventive principles, it will be understood that the invention may be embodied otherwise without departing from such principles.

What is claimed is:

1. A control system for disengaging a clutch between an engine and a load thereon and for varying the operating speed of the engine comprising:
    clutch disengaging means including a pneumatic actuator connected to said clutch,
    throttle control means for adjusting the speed of said engine including a hydraulic actuator,
    hydraulic fluid reservoir means,
    means connecting a lower portion of said fluid reservoir means to said hydraulic actuator,
    an electrically actuated solenoid valve means located in said connecting means for blocking or permitting flow of hydraulic fluid from said fluid reservoir means to said hydraulic actuator,
    air supply means for pressurizing an upper portion of said fluid reservoir means and for supplying compressed air to said pneumatic actuator and said hydraulic actuator,
    an electrically actuated clutch solenoid valve connecting said air supply means to said pneumatic actuator,
    an electrically actuated throttle solenoid valve for connecting said air supply means to an upper portion of said hydraulic reservoir,
    clutch disengagement circuit means for connecting an electrical power source to said clutch solenoid valve to supply air pressure from said air supply means to said pneumatic actuator to disengage said clutch and at the same time to energize said solenoid valve means to permit the flow of hydraulic fluid from said hydraulic actuator to said reservoir to thereby substantially reduce engine operating speed upon clutch disengagement, and
    engine operating speed control circuit means for alternatively connecting an electrical power source to said solenoid valve means and to said throttle solenoid valve to pressurize said fluid reservoir means from said air supply means and cause flow of hydraulic fluid through said solenoid valve means to said hydraulic actuator to thereby increase the speed of said engine, or for connecting said electrical power source to said solenoid valve means without energizing said throttle solenoid valve to thereby release the hydraulic pressure in said hydraulic actuator and permit flow of hydraulic fluid from said actuator to said reservoir to thereby decrease the speed of said engine.

2. The combination of claim 1 wherein said hydraulic actuator includes spring means for biasing said actuator toward a speed decrease position and wherein said clutch solenoid valve also includes means for connecting said air supply means to said hydraulic actuator to assist said spring means in decreasing the engine speed upon disengagement of said clutch.

3. The combination of claim 2 wherein said air supply means comprises an air pump mounted upon and driven by said engine.

4. The combination of claim 3 including an electrical power source, said source being the battery within the normal electrical system of said engine.

5. The combination of claim 3 wherein said clutch disengagement circuit means includes a normally open push button switch and wherein said speed control circuit means includes a normally open single pole double throw switch.

6. A remote control system for disengaging a clutch between an engine and a load thereon and for remotely varying the operating speed of the engine comprising:
    clutch disengaging means including actuator means connected to said clutch,
    throttle control means for adjusting the speed of said engine, said system including:
    a hydraulic actuator,
    hydraulic fluid reservoir means,
    means connecting a lower portion of said fluid reservoir means to said hydraulic actuator,
    an electrically actuated solenoid valve means located in said connecting means for blocking or permitting flow of hydraulic fluid from said fluid reservoir means to said hydraulic actuator,
    air supply means for pressurizing an upper portion of said fluid reservoir means and a portion of said hydraulic actuator,
    an electrically actuated clutch solenoid for controlling the actuator means connected to said clutch,
    an electrically actuated throttle solenoid valve for connecting said air supply means to an upper portion of said hydraulic reservoir,
    clutch disengagement circuit means for connecting an electrical power source to said clutch solenoid to disengage said clutch and at the same time to energize said solenoid valve means to permit the flow of hydraulic fluid from said hydraulic actuator to said reservoir to thereby substantially reduce engine operating speed upon clutch disengagement, and engine operating speed control circuit means for alternatively connecting an electrical power source to said solenoid valve means and to said throttle solenoid valve to pressurize said fluid reservoir means from said air supply means and cause flow of hydraulic fluid through said solenoid valve means to said hydraulic actuator to thereby increase the speed of said engine, or for connecting said electrical power source to said solenoid valve means without energizing said throttle solenoid valve to thereby release the hydraulic pressure in said hydraulic actuator and permit flow of hydraulic fluid from said actuator to said reservoir to thereby decrease the speed of said engine.

7. The combination of claim 6 wherein said hydraulic actuator includes spring means for normally biasing said actuator toward a speed decrease position and wherein said clutch solenoid also includes means for connecting said air supply means to said hydraulic actuator to assist said spring means in rapidly decreasing the engine speed upon disengagement of said clutch.

8. The combination of claim 7 wherein said air supply means comprises an air pump mounted upon and driven by said engine.

9. The combination of claim 8 wherein said actuator means for disengaging said clutch is pneumatic, and wherein said clutch disengagement circuit means includes a normally open push button switch and wherein said speed control circuit means includes a normally open single pole double throw switch.

10. In combination, an internal combustion engine, a load connected to said engine, a clutch, and a control system for disengaging said clutch from said engine and for varying the operating speed of the engine comprising:
    clutch disengaging means including a pneumatic actuator connected to said clutch,
    throttle control means for adjusting the speed of said engine including a hydraulic actuator,
    hydraulic fluid reservoir means,
    means connecting a lower portion of said fluid reservoir means to said hydraulic actuator,
    an electrically actuated solenoid valve means located in said connecting means for blocking or permitting flow of hydraulic fluid from said fluid reservoir means to said hydraulic actuator,
    air supply means for pressurizing an upper portion of said fluid reservoir means and for supplying compressed air to said pneumatic actuator and said hydraulic actuator,
    an electrically actuated clutch solenoid valve connecting said air supply means to said pneumatic actuator,
    an electrically actuated throttle solenoid valve for connecting said air supply means to an upper portion of said hydraulic reservoir,
    clutch disengagement circuit means for connecting an electrical power source to said clutch solenoid valve to supply air pressure from said air supply means to said pneumatic actuator to disengage said clutch and at the same time to energize said solenoid valve means to permit the flow of hydraulic fluid from said hydraulic actuator to said reservoir to thereby substantially reduce engine operating speed upon clutch disengagement, and
    engine operating speed control circuit means for alternatively connecting an electrical power source to said solenoid valve means and to said throttle solenoid valve to pressurize said fluid reservoir means from said air supply means and cause flow of hydraulic fluid through said solenoid valve means to said hydraulic actuator to thereby increase the speed of said engine, or for connecting said electrical power source to said solenoid valve means without energizing said throttle solenoid valve to thereby release the hydraulic pressure in said hydraulic actuator and permit flow of hydraulic fluid from said actuator to said reservoir to thereby decrease the speed of said engine.

11. The combination of claim 10 wherein said hydraulic actuator includes spring means for biasing said actuator toward a speed decrease position and wherein said clutch solenoid valve also includes means for connecting said air supply means to said hydraulic actuator to assist said spring means in decreasing the engine speed upon disengagement of said clutch.

12. A remote control system for varying the operating speed of an internal combustion engine comprising:
    throttle control means for adjusting the speed of said engine, said means including:
    a hydraulic actuator connected to said engine,
    hydraulic fluid reservoir means,
    means connecting a lower portion of said fluid reservoir means to said hydraulic actuator,
    an electrically actuated solenoid valve means located in said connecting means for blocking or permitting flow of hydraulic fluid from said fluid reservoir means to said hydraulic actuator,
    air supply means for pressurizing an upper portion of said fluid reservoir means,
    an electrically actuated throttle solenoid valve for connecting said air supply means to an upper portion of said hydraulic reservoir,
    engine operating speed control circuit means for alternatively connecting an electrical power source to said solenoid valve means and to said throttle solenoid valve to pressurize said fluid reservoir means from said air supply means and cause flow of hydraulic fluid through said solenoid valve means to said hydraulic actuator to thereby increase the speed of said engine, or for connecting said electrical power source to said solenoid valve means without energizing said throttle solenoid valve to thereby release the hydraulic pressure in said hydraulic actuator and permit flow of hydraulic fluid from said actuator to said reservoir to thereby decrease the speed of said engine.

13. The combination of claim 12 wherein said hydraulic actuator includes spring means for normally biasing said actuator toward a speed decrease position and means for connecting said air supply means to said hydraulic actuator to assist said spring means in decreasing the engine speed.

* * * * *